United States Patent [19]

Van de Walle

[11] Patent Number: 4,834,957
[45] Date of Patent: May 30, 1989

[54] CONCENTRATED SUSPENSION OF AQUEOUS MAGNESIUM OXIDE

[75] Inventor: Richard H. Van de Walle, Columbia, Md.

[73] Assignee: Martin Marietta Corporation, Bethesda, Md.

[21] Appl. No.: 41,806

[22] Filed: Apr. 21, 1987

Related U.S. Application Data

[63] Continuation-in-part of Ser. No. 858,980, May 2, 1986, abandoned, which is a continuation-in-part of Ser. No. 767,301, Aug. 19, 1985, abandoned, which is a continuation-in-part of Ser. No. 661,766, Oct. 17, 1984, abandoned.

[51] Int. Cl.$^4$ .............................................. A23K 1/00
[52] U.S. Cl. ........................................ 423/268; 71/63; 71/64.08; 252/363.5; 426/74
[58] Field of Search ............... 423/635, 265, 267, 268, 423/275; 252/363.5; 426/69, 74, 330; 71/63, 64.08

[56] References Cited

U.S. PATENT DOCUMENTS

| | | | |
|---|---|---|---|
| Re. 31,804 | 1/1985 | Skoch et al. | 426/658 |
| 4,171,385 | 10/1979 | Skoch et al. | 426/658 |
| 4,171,386 | 10/1979 | Skoch et al. | 426/658 |
| 4,202,887 | 5/1980 | Talbot et al. | 426/154 |
| 4,219,572 | 8/1980 | Jackman | 426/69 |
| 4,230,610 | 10/1980 | Falcione et al. | 260/29.6 M |
| 4,267,197 | 5/1981 | Sawhill | 426/69 |
| 4,271,142 | 6/1981 | Puglia et al. | 424/14 |
| 4,382,966 | 5/1983 | Mickus et al. | 426/69 |
| 4,431,675 | 2/1984 | Schroeder et al. | 426/69 |
| 4,597,969 | 7/1986 | Maxfield et al. | 424/157 |

OTHER PUBLICATIONS

Kirkothmer, *Encyclopedia of Science and Technology* 1981 3rd edition, John Wiley & Sons NY, vol. 8, p. 903; vol. 14 pp. 309-311.

*Primary Examiner*—John Doll
*Assistant Examiner*—Jeffrey Edwin Russel
*Attorney, Agent, or Firm*—Herbert W. Mylius; Gay Chin

[57] ABSTRACT

An aqueous magnesium oxide suspension is disclosed which comprises from about 15 to about 50 percent by weight MgO, based on the combined weight of water, MgO, suspension aid, and anti-hydration agent. Suspension aids such as Xanthan gum and guar gum are utilized in the presence of a lignin sulfonate anti-hydration agents to provide a highly stable concentrated suspension, useful as a base for fertilizers, animal feeds, etc.

20 Claims, No Drawings

4,834,957

CONCENTRATED SUSPENSION OF AQUEOUS MAGNESIUM OXIDE

This is a continuation-in-part of application Ser. No. 858,980, filed May 2, 1986, now abandoned, which is a continuation-in-part of Ser. No. 767,301, filed Aug. 19, 1985, now abandoned, which is in turn a continuation-in-part of application Ser. No. 661,766, filed Oct. 17, 1984, now abandoned.

TECHNICAL FIELD

This invention relates to a novel suspension of hard-burned magnesium oxide in water. More particularly, the invention relates to an aqueous suspension of magnesium oxide of fine particle size, in the presence of an anti-hydration agent, the suspension displaying minimal hydration of MgO to $Mg(OH)_2$, controlled viscosity, and excellent suspension stability at high magnesium oxide concentration, i.e., greater than about 10 to 15 percent. Such concentrated suspensions are useful as bases for the preparation of liquid animal feeds, fertilizers, etc.

BACKGROUND ART

Magnesium oxide has numerous applcations in both agricultural and industrial fields. In the agricultural area, particularly, magnesium oxide is useful as an animal feed additive to raise magnesium blood serum levels, which prevents outbreaks of hypomagnesemia in cattle, and in fertilizers as a vital source of plant nutrient magnesium. In industry, magnesium oxide is useful as a boiler feed additive and is one of the primary reactant materials in many chemical process reactions, such as acid neutralization, cation replacement, and hydration reactions.

For many of these uses and applications, it would be advantageous to provide a high concentration aqueous magnesium oxide suspension to facilitate handling and ease of incorporation into a resultant product or reaction, or for use as a direct application material as in the case, for example, of a boiler feed additive, or as a boiler and air heater neutralization agent. However, prior art slurries or suspensions of magnesium oxide which use MgO having the surface area described by this invention at high concentrations exhibit excessive hydration of MgO to $Mg(OH)_2$, and resultant unacceptably high viscosity values for normal pumping and transport.

For example, prior art animal feed supplements commonly contain MgO with sources of nitrogen, phosphorous, and sugars. The insoluble magnesium oxide, however, frequently settles and/or causes formation of an immobile gel-like mixture, particularly at concentrations above about six percent. Various attempts have been made to achieve suspension stabilization of MgO containing feed supplements. Thus, in U.S. Pat. No. 4,219,572, Jackman et al. teach the presence of xanthan gum to stabilize liquid feed supplements containing a maximum of 6 percent MgO. The xanthan gum is said to provide suspension stabilization. As will be exemplified hereinafter, however, the MgO content may not be raised significantly above 6 percent without particularly deleterious effects upon the viscosity of the suspension. This is believed due to the fact that Jackman et al. do not employ a hydration inhibiting agent, such as is used in the present invention, to prevent hydration of the MgO to $Mg(OH)_2$.

In Mickus et al., U.S. Pat. No. 4,382,966, an animal feed suspension is taught wherein hydrated xanthan gum stabilizes the suspension by increasing the viscosity of the liquid supplements and forming a thixotropic gel. Lignin liquor may be added as a source of carbohydrate or sugar nutrient, and MgO may be added as an insoluble mineral nutrient. The goal of Mickus et al. is to achieve a high viscosity gel, directly opposite the goal of the present invention.

Falcione et al., in U.S. Pat. No. 4,230,610, teach the use of polyacrylates as a dispersant to reduce suspension viscosity and permit utilization of 41.6 percent MgO in a pigment dispersion.

Sawhill, U.S. Pat. No. 4,267,196, teaches an animal feed supplement containing sufficient ammonium orthophosphate or sulfate to form a gel, to which a dispersing agent such as gelatinized starch or clay is added to stabilize the insoluble solid nutrient. Lignin sulfonate may be utilized as a source of sugar or carbohydrate nutrient.

The prior art, accordingly, frequently seeks to achieve a gel state, and fails to disclose a concentrated, stable, hydration resistant suspension of from about 10 to 15 percent up to 50 percent MgO wherein suspension stability is improved by the presence of a suspension aid, and hydration of the MgO is prevented by the presence of an anti-hydration agent.

DISCLOSURE OF INVENTION

The present invention comprises a highly concentrated suspension of hardburned magnesium oxide in water, a suspension aid to maintain suspendibility, and an anti-hydration agent, which limits hydration of the MgO to $Mg(HO)_2$. Such a suspension has a concentration of from about 10 to 15 percent up to about 50 percent MgO by weight.

BEST MODE FOR CARRYING OUT THE INVENTION

High purity hardburned magnesium oxide is typically the product of reacting magnesium chloride solutions, for example, seawater or magnesium chloride brine, with lime (CaO) or dolomitic lime (MgO.CaO) to precipitate insoluble magnesium hydroxide which is then calcined, usually between 1150° C. and 1550° C., resulting in a magnesium oxide product with a surface area of between 0.5 $m^2/g$ and 10 $m^2/g$. Alternatively, magnesium oxide with approximately the same surface area specifications can be produced commercially by calcining natural magnesite ($MgCO_3$).

The magnesium oxide which is most desired for use in the described invention is generally termed hardburned grade magnesium oxide. Three classifications of calcination, or burn, are generally recognized in MgO production: lightburned—magnesium oxide products which are calcined at temperature generally up to about 1150° C.; hardburned—magnesium oxide products which are calcined in the range from about 1150° C. to about 1925° C.; and deadburned—magnesium oxide products which are calcined at temperatures generally over 1925° C. Hardburned magnesium oxide is most desired for this application because such a material will not hydrate as rapidly as lightburned magnesium oxide, particularly in the presence of an anti-hydration agent as set forth hereinafter, thus insuring enough water in the mixture for the product to remain in a fluid pumpable consistency at this desired high level of magnesium oxide concentration. At the same time, the material is reactive enough, that is, has a high enough surface area to be useful in a varity of applications, including use as an animal feed or fertilizer. Deadburned magnesium oxide could be used in the described process, but its usefulness in most envisioned applications would be extremely limited due to low, or no reactivity.

Magnesium oxide reactivity is a function of calcination temperature, particle surface area, and particle size. Magnesium oxide reactivity can be implied from calcination temperature and physical particle size or reactivity can be measured directly. Measurement is accomplished by reacting a weighed amount of MgO with a standardized concentration of acid and recording the temperature attained within a 10 minute period. The acid used is normally acetic acid and the test is known as the Acetic Acid Temperature Rise (AATR) activity test. Such a test is normally applied to designated hard-burned MgO products. Typical temperature rise measurements are from 1° C. to 100° C. within 10 minutes.

For a suspension according to the present invention, dry magnesium oxide powder in a screen size ranging from minus 50 Tyler mesh to minus 325 Tyler mesh is suitable. Most preferably, a hardburned material which passes a 200 Tyler mesh screen is used. The fine particle size is particularly advantageous in fertilizer formulations.

The ratio of water to magnesium oxide can range from approximately 1:1 to any lesser oxide concentration, typically between about 15 percent MgO and 50 percent MgO. It is preferred, for purposes of economy in storage and shipment and, at the same time, to maintain long term stability, to produce a magnesium oxide suspension of from 33 percent MgO to 45 percent MgO by weight. As utilized in this specification, concentrations shall be by weight, based upon the weight of the concentrated suspension.

A suspension aid used in a concentration from 0.05 percent to 5.0 percent by weight is required for a suspension according to the present invention. Preferred suspension agents include a xanthan gum which is a heteropolysaccharide gum isolated from the fermentation broth of many organisms of the xanthomonas species and is commercially available in a form suitable for practice in this invention. Alternative gums available for suspension use which are commercially available include guar gum and xanthan gum combinations. Guar gums are natural polysaccharide galactomannans produced by milling and separation of the endosperm of the guar seed kernel, a process very similar to milling flour from wheat. Such natural gum combinations are produced by Hercules, Inc., and are available under the trade name Genuzan. Xanthan gum and guar gum are preferably used in concentrations of from about 0.05 percent to about 0.5 percent by weight.

Alternatively, colloidal suspending clays such as attapulgite clay, sepiolite clay, or bentonite clay may be employed as the suspending agent. Colloidal attapulgite and colloidal sepiolite clay produce stable suspensions as a result of dispersion of bundles of needle-shaped crystal lattice to form a random lattice that entraps liquid to increase suspension ability of the liquid system.

Attapulgite colloidal clays are fully discussed in "Colloid Grades"; Haden W. L., and Schwint I. A.; INEC; vol. 59; September, 1967; pp. 58–69. Colloidal bentonite clay is a high colloidal plastic clay which has the unique characteristic of swelling several times its original volume when placed in water and forms thixotropic gels in water at relatively low concentrations.

Such clays including attapulgite, sepiolite and bentonite must be present in concentrations from 0.5 percent to 5 percent by weight; however, clays are not preferred for this invention as they often adversely affect the storability of the magnesium oxide suspension slurries at high MgO concentrations.

The hydration of MgO to Mg(OH)$_2$, which would normally proceed at a rapid rate in this type of MgO suspension, is greatly retarded by the novel addition of an anti-hydration agent, or hydration inhibitor, lending greatly improved chemical stability to the product, greatly modifying viscosity and also improving viscosity stability. Lignin sulfonate are preferred for this purpose. Calcium lignin sulfonate and sodium lignin sulfonate are the most readily available, but any commercially available metal lignin sulfonate would be appropriate so long as it gives the desired viscosity modification. Other anti-hydration agents may be utilized, such as methyl naphthaline or sodium sulfonate, either alone or in combination with lignin sulfonate.

What is desired is a water soluble agent with the capability of forming a barrier layer around the individual MgO particles, thus "hiding" them from water to prevent hydration. Magnesium oxide is unique in terms of surface activity, and care must be exercised in selecting an appropriate anti-hydration agent. Concentration of such an anti-hydration agent should be high enough to effectively reduce the available surface area of the oxide particles for hydration in the concentrated suspension, but not so high as to unduly inhibit reactivity of the magnesia in its ultimate, diluted, state for use. It has been found that from about 0.5 to about 5 percent of anti-hydration agent should be present in the concentrated suspension of the present invention.

The lignin sulfonates used in the instant invention are organics derived from the sulfite pulping of wood. Such lignin products normally contain lignin sulfonates of a broad molecular size range. A product known as Norlig A from the Reed Lignin Company has been shown to be an effective anti-hydration agent in this invention. Typical analysis on a moisture free basis for this calcium lignin sulfonate is as follows:

| | |
|---|---|
| Total Sulfur as S % | 3.0 |
| Calcium as Ca % | 4.0 |
| Sodium as Na % | 0.1 |
| Reducing Sugars % | 15.7 |
| Methoxyl % | 8.9 |

Lignin sulfonates are available commercially in either a dry powder form or an aqueous suspension composed of 50 percent to 60 percent solids. Either of these lignin sulfonate forms is useful in the present invention; however, the liquid form is preferable because of its lower cost and ease of handling. Lignin sulfonate suspensions in the 50 percent to 60 percent solids range can be employed in concentration levels of 1.0 percent to 5.0 percent of the total magnesium oxide suspension weight. However, the preferred range for this material is from 2.5 percent to 4.0 percent by weight. On a dry lignin basis, the additions are at levels of from 0.5 percent to 3.0 percent by weight, and the preferred range is from about 1.2 to about 2.4 percent by weight of the suspension.

Suspensions according to the present invention can be prepared using any high speed mixing equipment, whether mixing is accomplished by pump recirculation or turbine agitation. The resulting magnesium oxide suspension may have a concentration of up to about 50 percent MgO, or more, by weight.

When properly formulated, a product in accordance with this invention has a shelf life in excess of twelve weeks with minimal settling without agitation. With minor agitation or recirculation, the magnesium oxide suspension can be stored for four to six months with the magnesium oxide content remaining substantially as magnesium oxide and with only limited hydration to $Mg(OH)_2$. The suspension should, however, be protected from freezing. After shipping to its point of use, such a suspension may then be utilized by addition to an animal feed supplement comprising, for example, urea, molasses, and phosphoric acid and/or ammonium polyphosphate. The concentrated suspension of the present invention must, in most instances, be diluted for such utilities as animal feed or fertilizer. The importance of achieving a highly concentrated, but still low enough viscosity suspension to be easily pumped, resides in extended shelf life, reduction in storage space, convenience in handling, ability to utilize smaller equipment, reduction in transport cost, etc. In addition to such advantages, the pumpable concentrate of the present invention offers a high surface area magnesium oxide, having a high degree of reactivity and small particle size.

The following are examples of typical formulations and results which can be expected in terms of long term viscosity properties and limited hydration of the magnesium oxide content. Hydration is in terms of loss on ignition of dried suspension sample.

EXAMPLE I

Using a high speed mixer, a suspension of the following ingredients was prepared:

| | |
|---|---|
| 53.70% | Water |
| 43.10% | Magnesium Oxide |
| 0.20% | Xanthan Gum |
| 3.00% | Lignin Sulfonate (50–60% solids) |
| 100.00% | |

Periodically, over a twelve week period, the viscosity of the suspension was measured in centipoises as follow:

| Week | 1 | 3 | 5 | 7 | 9 | 12 |
|---|---|---|---|---|---|---|
| Viscosity (cps) | 225 | 270 | 218 | 218 | 219 | 210 |

EXAMPLE II

As in Example I, a suspension of the following ingredients was prepared:

| | |
|---|---|
| 53.65% | Water |
| 43.10% | Magnesium Oxide |
| 0.25% | Xanthan Gum |
| 3.00% | Lignin Sulfonate (50–60% solids) |
| 100.00% | |

The twelve week viscosity measurements were as follows:

| Week | Initial | 2 | 4 | 6 | 8 | 10 | 12 |
|---|---|---|---|---|---|---|---|
| Viscosity (cps) | 407 | 374 | 351 | 354 | 361 | 330 | 209 |

Over the same twelve week period, the MgO hydration was measured as a percent loss on ignition (LOI) of a dried sample minus organics:

| Week | Initial | 2 | 4 | 6 | 8 | 10 | 12 |
|---|---|---|---|---|---|---|---|
| LOI | 2.01 | 2.45 | 2.15 | 2.59 | 2.00 | 2.58 | 3.51 |

EXAMPLE III

In the same fashion, a suspension of the following ingredients was prepared:

| | |
|---|---|
| 50.90% | Water |
| 43.10% | Magnesium Oxide |
| 3.00% | Attapulgite Clay |
| 3.00% | Lignin Sulfonate (50–60% solids) |
| 100.00% | |

Viscosity measurements over a six week period were as follows:

| Week | Initial | 2 | 4 | 6 | 8 | 10 | 12 |
|---|---|---|---|---|---|---|---|
| Viscosity (cps) | 380 | 170 | 349 | 550 | 945 | 1214 | 1514 |

EXAMPLE IV

To contrast the present invention with the performance of the Jackman et al. patent, U.S. Pat. No. 4,219,572, at higher levels of MgO than specified in the patent, the following formulations were developed, which are essentially the same as the example formulation at column 2, lines 31–43 of the Jackman et al. patent. In these formulations, however, 8 percent, 12 percent, and 20 percent levels of MgO were added, and the 1 percent vitamin/mineral slurry was deleted.

| | Percent | | |
|---|---|---|---|
| Ingredients | 8% MgO | 12% MgO | 20% MgO |
| 79.5 Brix Can Molasses | 60.4 | 60.4 | 60.4 |
| Water | 17.5 | 13.5 | 5.5 |
| 50% Urea Liquor | 10.5 | 10.5 | 10.5 |
| 75% Phosphoric Acid | 2.5 | 2.5 | 2.5 |
| AniMag LFS | 8.0 | 12.0 | 20.0 |
| Sulfuric Acid | 1.0 | 1.0 | 1.0 |
| Xantham Gum | 0.1 | 0.1 | 0.1 |

Viscosity measurements were taken on each sample at weekly intervals.

| | Viscosity (centipoise) Data 100 rpm | | | | |
|---|---|---|---|---|---|
| Week | Initial | 1 Week | 2 Weeks | 3 Weeks | 4 Weeks |
| 8% MgO | 250 | 672 | 589 | 1043 | 998 |
| 12% MgO | 416 | 1408 | 1376 | 1683 | 1638 |
| 20% MgO | 12229 | 3987 | 4858 | 5422 | 5856 |

Generally accepted maximum levels of viscosity for liquid animal feeds are about 1000 centipoise. As evidenced by the viscosity data above after only one week of storage, viscosity levels for 12 percent MgO and 20 percent MgO are far in excess of this viscosity, and the viscosity of the 8 percent MgO approaches this level after only three weeks. Clearly, the amount of MgO present in the animal feed may not be considered arbitrary, in view of the effect upon viscosity resulting from increased MgO content. Further, comparison of the viscosity values of concentrated slurries of MgO obtained by the methods of Jackman et al. and the method of the present invention clearly indicates that viscosity change is controlled by the presence of lignin sulfonate anti-hydration agent.

Industrial Applicability

A concentrated magnesium oxide suspension of this invention is an excellent source of magnesium for complete liquid suspension fertilizer mixtures, or for direct magnesium application in liquid suspension on soil or forage. The stability of such a suspension helps to maintain stable viscosities with other fertilizer ingredients. To ensure top blending performance when using such a suspension in combination with orthophosphates for suspension formulations, however, the phosphate should be kept at or below 12 percent by weight $P_2O_5$ and the magnesium level should be kept at or below 2.5 percent by weight Mg.

The following is a typical example of a fertilizer formulation which may be obtained by dilution of a concentrated aqueous magnesium oxide suspension prepared in accordance with this invention.

EXAMPLE V

One ton of a 12-9-12 liquid suspension fertilizer containing 2.5 percent Mg is prepared according to the following formulation:

| | |
|---|---|
| 180 lbs. | Water |
| 200 lbs. | Magnesium Oxide Suspension as in Example II |
| 600 lbs. | 10-30-0 fertilizer |
| 35 lbs. | Clay |
| 600 lbs. | Nitrogen Solution (30%) |
| 385 lbs. | Potash |
| 2000 lbs. | |

The magnesium oxide suspension may be added at any convenient point in the batching sequence so long as any phosphate present is not in its most concentrated condition. Thus, if a phosphate base is first in the batching sequence, the magnesium oxide suspension should be added after the phosphate base has been diluted with water or other fertilizer ingredients.

Fertilizer formulations, as above, may include additional fertilizer materials such as calcium, zinc, manganese, ammonium sulfate, and especially polyphosphates, but trial bucket batches may be required to determine acceptable viscosity levels.

It is understood that the above description of the present invention is susceptible to considerable modification, change, and adaptation by those skilled in the art, and such modifications, changes, and adaptations are intended to be considered to be within the scope of the present invention, which is set forth by the appended claims.

What is claimed is:

1. An aqueous magnesium oxide suspension comprising water, from about 15 percent by weight to about 50 percent by weight hardburned magnesium oxide ranging in size from about minus 50 Tyler mesh to about minus 325 Tyler mesh, a suspension aid selected from the group consisting of xanthan gum, guar gum, mixtures thereof, and colloidal clays, and an anti-hydration agent selected from the group consisting of lignin sulfonate, methyl naphthaline, sodium sulfonate, and mixtures thereof.

2. A suspension as set forth in claim 1, wherein said suspension aid comprises from about 0.05 to about 0.5 percent xanthan gum.

3. A suspension as set forth in claim 2, wherein said magnesium oxide comprises from about 33 to about 45 percent by weight of the suspension.

4. A suspension as set forth in claim 1, wherein said anti-hydration agent comprises from about 0.5 to about 3.0 percent by weight lignin sulfonate on a dry lignin basis.

5. A suspension as set forth in claim 4, wherein said lignin sulfonate comprises from about 1.2 to about 2.4 percent by weight of the suspension on a dry lignin basis.

6. A suspension as set forth in claim 4, wherein said magnesium oxide comprises from about 33 to about 45 percent by weight of the suspension.

7. A suspension as set forth in claim 4, wherein said suspension aid is xanthan gum.

8. A suspension as set forth in claim 4, wherein said suspension aid is guar gum.

9. A suspension as set forth in claim 4, wherein said suspension aid is a colloidal clay in a concentration of from about 0.5 to about 5.0 percent by weight.

10. A suspension as set forth in claim 9, wherein the clay is selected from the group consisting of attapulgite, sepiolite, and bentonite clays.

11. A composition comprising a concentrated aqueous source of hardburned magnesium oxide, consisting of water, from about 15 percent to about 50 percent magnesium oxide ranging in size from minus 50 to minus 325 Tyler mesh screen size, from about 0.05 percent to about 5.0 percent of a suspension aid selected from the group consisting of xanthan gum, guar gum, mixtures of xanthan and guar gum, and colloidal clays, and from about 0.5 percent to about 5.0 percent of an anti-hydration agent selected from the group consisting of lignin sulfonate, methyl naphthaline, sodium sulfonate, and mixtures thereof.

12. A composition as set forth in claim 11, wherein said suspension aid comprises from about 0.05 to about 0.5 percent xanthan gum.

13. A composition as set forth in claim 11, wherein said magnesium oxide comprises from about 33 to about 45 percent, and said anti-hydration agent comprises from about 0.5 to about 3.0 percent by weight lignin sulfonate on a dry lignin basis.

14. A composition as set forth in claim 13, wherein said anti-hydration agent comprises from about 1.2 to about 2.4 percent by weight lignin sulfonate, on a dry lignin basis.

15. An aqueous magnesium oxide suspension comprising water, from about 15 percent to about 50 percent magnesium oxide ranging in size from minus 50 to minus 325 Tyler mesh screen size, a suspension aid selected from the group consisting of xanthan gum, guar gum, mixtures of xanthan and guar gums, and colloidal clays, and an anti-hydration agent selected from the group consisting of lignin sulfonates, methyl naphthaline, sodium sulfonate, and mixtures thereof, said suspension having a viscosity of less than about 1000 centipoise.

16. A suspension as set forth in claim 15, wherein said suspension aid comprises from about 0.05 to about 0.5 percent by weight xanthan gum.

17. A suspension as set forth in claim 16, wherein said magnesium oxide comprises from about 33 to about 45 percent by weight of the suspension.

18. A suspension as set forth in claim 15, wherein said magnesium oxide comprises from about 33 to about 45 percent by weight of the suspension.

19. A suspension as set forth in claim 18, wherein said lignin sulfonate comprises from about 1.2 to about 2.4 percent by weight of the suspension on a dry lignin basis.

20. A suspension as set forth in claim 18, wherein said magnesium oxide comprises from about 33 to about 45 percent by weight of the suspension.

* * * * *